United States Patent [19]
Koch et al.

[11] Patent Number: 6,029,711
[45] Date of Patent: Feb. 29, 2000

[54] HOSE FOR A HOSE PUMP

[75] Inventors: Jochim Koch, Ratzeburg; Ralf Ernst Löser, Lübeck, both of Germany

[73] Assignee: Dräger Medizintechnik GmbH, Germany

[21] Appl. No.: 09/288,721

[22] Filed: Apr. 9, 1999

[30] Foreign Application Priority Data

Apr. 11, 1998 [DE] Germany .................. 298 06 660 U

[51] Int. Cl.[7] .................................................. F16L 11/00
[52] U.S. Cl. .................. 138/118; 138/172; 138/DIG. 11
[58] Field of Search .................. 138/128, 156, 138/170, 177, 178, DIG. 11, 140, 118

[56] References Cited

U.S. PATENT DOCUMENTS

| | | |
|---|---|---|
| 377,318 | 1/1888 | Marshall ................................. 138/177 |
| 385,109 | 6/1888 | Garver et al. .......................... 138/178 |
| 2,742,388 | 4/1956 | Russell ................................... 138/156 |
| 3,201,861 | 8/1965 | Fromson et al. ....................... 138/140 |
| 3,624,800 | 11/1971 | Swick ..................................... 138/177 |
| 3,939,875 | 2/1976 | Osborn et al. ......................... 138/178 |
| 3,961,486 | 6/1976 | Granholm et al. ............... 138/DIG. 11 |
| 3,996,968 | 12/1976 | Bergman et al. ...................... 138/177 |
| 4,478,661 | 10/1984 | Lewis ..................................... 138/128 |
| 4,862,922 | 9/1989 | Kite, III ................................. 138/128 |

*Primary Examiner*—James Hook
*Attorney, Agent, or Firm*—McGlew and Tuttle, P.C.

[57] ABSTRACT

A hose for hose pumps is provided. The hose has, in the unloaded state, an essentially elliptical cross-sectional profile with a long semiaxes ending in a point, with an outer width B1 of about 0.8 to 10 mm, a maximum outer height H1 of about 0.4 to 5 mm, the numerical ratio of the outer width B1 to the maximum outer height H1 being about 2:1, and with a wall thickness of about 0.3 to 2 mm, wherein the hose essentially consists of one of the elastic materials rubber, silicone rubber, nylon, polyethylene or polyamide.

8 Claims, 1 Drawing Sheet

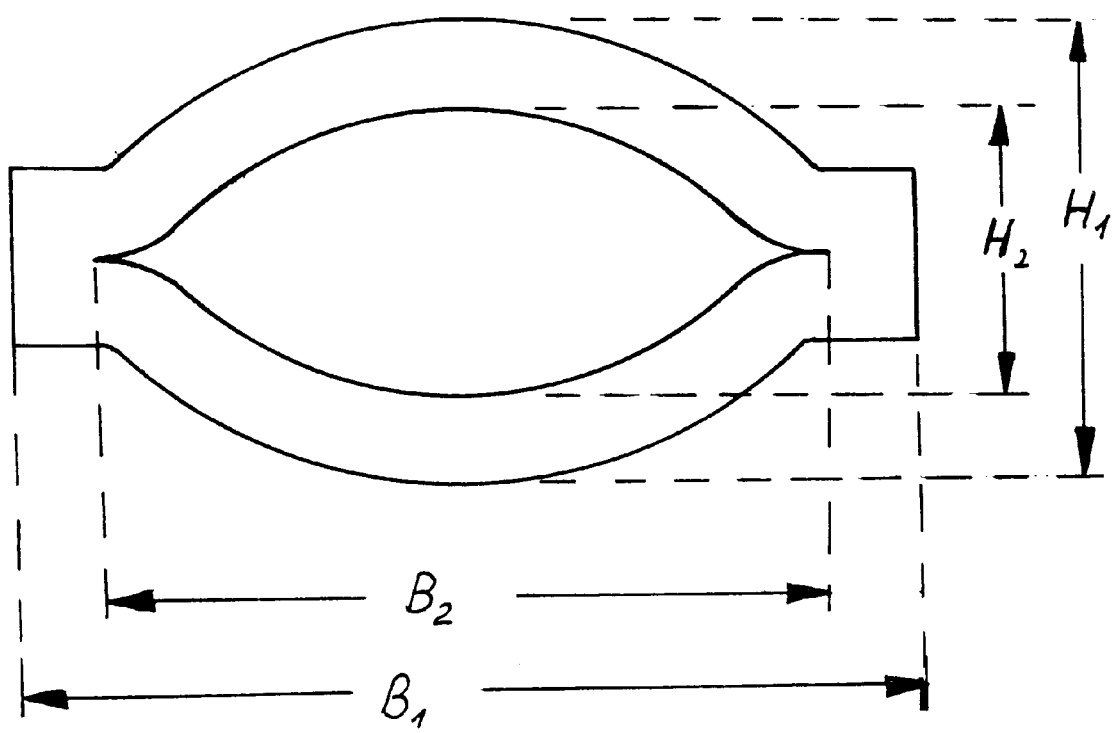

HOSE FOR A HOSE PUMP

FIELD OF THE INVENTION

The present invention pertains to a hose for a hose pump.

BACKGROUND OF THE INVENTION

Hose pumps are used in medical engineering to meter liquids, e.g., to meter water in a breathing air humidifier. Such pumps are also sometimes referred to as peristaltic pumps.

Commercially available hose pumps have d.c. motors with sliding collectors, which operate at relatively high speeds. The service life of these motors is limited and corresponds, at the most, to a continuous operation for less than one year; the costs are rather substantial. Collectorless motors with external commutator are still expensive. For adjustment to the low speeds needed by a hose pump, these motors are provided with a gear, which causes additional friction, associated with wear and loss of power of the motor.

Stepping motors as a drive for hose pumps have a substantially longer service life, because they run at a lower speed and are therefore substantially less expensive than d.c. motors. One drawback of such stepping motors is that they deliver a relatively low torque in relation to their size, so that the use of a stepping motor instead of a geared d.c. motor is not readily possible.

To reduce the friction in a hose pump and to make it possible to use a stepping motor with a relatively low specific torque as a drive motor, a relatively thin-walled, elastic pump hose was tensioned over the pump head, so that the rollers of the pump head close individual segments in the hose, which bring about delivery of the enclosed liquid during the rotation of the pump head. The pretension of the hose determines the maximum delivery head and the maximum pump pressure. The friction, which is caused by this principle, is generated by the friction of the rollers of the pump head and by the inner friction in the hose material.

One drawback of the latter principle of a hose pump arises from the fact that a thin-walled, elastic hose with a usual circular cross section is worn after only a few hours of operation.

SUMMARY AND OBJECTS OF THE INVENTION

The primary object of the present invention is to propose a hose for a hose pump that has a prolonged service life in operation and a relatively thin-walled, elastic material is used.

According to the invention, a hose for hose pumps is provided. The hose has, in the unloaded state, an essentially elliptical cross-sectional profile with a long semiaxes ending in a point, with an outer width B1 of about 0.8 to 10 mm, a maximum outer height H1 of about 0.4 to 5 mm, the numerical ratio of the outer width B1 to the maximum outer height H1 being about 2:1, and with a wall thickness of about 0.3 to 2 mm, wherein the hose essentially consists of one of the elastic materials rubber, silicone rubber, nylon, polyethylene or polyamide.

The silicone rubber preferably has a Shore hardness between 35 and 80 ShA. The hose preferably consists of a seamlessly extruded material.

One essential advantage of the hose according to the invention is due to the fact that a more wear-resistant solution is provided for the use of a thin hose material for the use of a relatively low-torque hose pump motor, especially a stepping motor.

The energy and power losses due to the inner friction in the hose material are obviously greatly reduced due to the solution of the invention.

The service life of a hose according to the present invention is correspondingly up to 100 times that of a hose with a usual circular cross section made of the same material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a cross sectional view through a hose of one exemplary embodiment of the present invention.

DESCRIPTION OF THE PREFERRED EMBODIMENT

Referring to the drawings in particular, in the compressed state, not shown, the hose comprises, when viewed geometrically, two smooth, parallel layers, with a height corresponding to twice the wall thickness.

To generate vacuum on the suction side, the hose must be hollow on the inside in the unloaded state and must not be collapsed. The FIGURE shows the cross section of the hose in the unloaded state.

The hose cross section is shown enlarged 20 times compared with the actual hose.

The dimensions of the exemplary embodiment are as follows: The wall thickness is 0.5 mm, the outer width B1 is 5 mm, and the inner width B2 is 4.2 mm. The maximum outer height H1 is 2.5 mm, and the inner height H2 is 1.5 mm. As can be recognized from the FIGURE, the hose has an essentially elliptical inner cross-sectional profile with the long semiaxes ending in a point. Concerning the outer contour, the circumferential line ends laterally in parallel to the long semiaxes of the elliptical cross-sectional profile and extends symmetrically at right angles at a distance of 0.5 B1 to the left and right of the mean perpendicular (perpendicular to the long semiaxes of the elliptical inner cross-sectional profile).

Experiments have confirmed that in the case of an outer width B1 of about 0.8 to 10 mm, the maximum outer height H1 must be about 0.4 to 5 mm at a B1:H1 numerical ratio of about 2:1 and a wall thickness of about 0.3 to 2 mm, the hose formed consisting essentially of one of the elastic materials rubber, silicone rubber, nylon, polyethylene or polyamide.

Silicone rubber with a Shore hardness between 35 and 80 ShA is especially advantageous.

The selection of the material is also determined by the liquid to be delivered, besides the elasticity. Silicone rubber is highly compatible with sterile water and has good durability for the conditions of use in hospitals and in routine health care in general. Silicone rubber may be sterilized even at temperatures higher than 100° C. Besides nylon, polyethylene or polyamide are other suitable hose materials if they are elastic and have good stretching properties over prolonged periods of use in prolonged load and release cycles.

The manufacture of a hose according to the present invention as a seamless extruded product through a corresponding nozzle in the form of an endless strand, which may be divided as desired, is particularly preferred.

In the preferred case of application in a hose pump, the hose is pretensioned over the pump head and the rollers of the pump head, so that the hose is only just sealed securely.

In the case of a pump head with a plurality of rollers (n), each sealing site must seal only one n-th of the pressure difference. If the hose is in contact with three rollers due to corresponding guidance in an example with six rollers, each sealing site must seal only ⅓ of the entire pressure difference. The liquid located between two rollers is delivered further during the rotation of the pump head and a delivery pressure is built up. The delivery capacity of the hose pump can be calculated from the speed of rotation of the pump head, multiplied by the amount of liquid enclosed on a complete circumference between the rollers.

The stability of the hose against collapsing due to vacuum in the hose is determined by the material (elasticity), by the wall thickness and the geometry of the hose cross section. In the compressed state, the hose assumes a rectangular cross-sectional shape with double wall thickness and resembles, on the whole, the eyelids in terms of the characteristics of the movement and in positioning.

While a specific embodiment of the invention has been shown and described in detail to illustrate the application of the principles of the invention, it will be understood that the invention may be embodied otherwise without departing from such principles.

What is claimed is:

1. A hose for hose pumps, the hose comprising in the unloaded state:

an essentially elliptical cross-sectional profile with the long semiaxes ending in a point, with an outer width B1 of about 0.8 to 10 mm, a maximum outer height H1 of about 0.4 to 5 mm, the numerical ratio of the outer width B1 to the maximum outer height H1 being about 2:1, and with a wall thickness of about 0.3 to 2 mm, wherein the hose is formed of one of the elastic materials rubber, silicone rubber, nylon, polyethylene or polyamide.

2. The hose in accordance with claim 1, wherein the silicone rubber has a Shore hardness between 35 and 80 ShA.

3. The hose in accordance with claim 2, wherein the hose consists of a seamlessly extruded material.

4. The hose in accordance with claim 1, wherein the hose consists of a seamlessly extruded material.

5. A hose for hose pumps, the hose comprising in the unloaded state:

an upper and a lower wall joined at flat edges defining an interior with an essentially elliptical cross-sectional profile with the long semiaxes ending in a point, with an outer width B1 of about 0.8 to 10 mm, a maximum outer height H1 of about 0.4 to 5 mm, the numerical ratio of the outer width B1 to the maximum outer height H1 being about 2:1, and with a wall thickness of about 0.3 to 2 mm, wherein the hose consists of an elastic material selected from the group consisting of rubber, silicone rubber, nylon, polyethylene or polyamide.

6. The hose in accordance with claim 5, wherein the silicone rubber has a Shore hardness between 35 and 80 ShA.

7. The hose in accordance with claim 6, wherein the hose consists of a seamlessly extruded material.

8. The hose in accordance with claim 5, wherein the hose consists of a seamlessly extruded material.

* * * * *